United States Patent [19]

Goto et al.

[11] Patent Number: 5,541,601
[45] Date of Patent: Jul. 30, 1996

[54] A/D CONVERSION CONTROL APPARATUS FOR AN INTERNAL COMBUSTION ENGINE

[75] Inventors: Yoshinori Goto; Tetsuya Ogino, both of Kariya, Japan

[73] Assignee: Nippondenso Co., Ltd., Kariya, Japan

[21] Appl. No.: 214,746

[22] Filed: Mar. 18, 1994

[30] Foreign Application Priority Data

Mar. 19, 1993 [JP] Japan ..................................... 5-060415
Nov. 9, 1993 [JP] Japan ..................................... 5-279480

[51] Int. Cl.⁶ ................................................. H03M 1/12
[52] U.S. Cl. ..................... 341/141; 364/431.03; 123/480
[58] Field of Search ........................ 341/141; 364/431.03, 364/431.04, 431.05, 431.08; 123/478, 479, 480, 486

[56] References Cited

U.S. PATENT DOCUMENTS

| | | | |
|---|---|---|---|
| 4,654,632 | 3/1987 | Yoshida et al. | 341/141 |
| 4,753,206 | 6/1988 | Inoue et al. | 123/480 |
| 5,081,454 | 1/1992 | Campbell, Jr. et al. | 341/141 |
| 5,088,044 | 2/1992 | Matsuura | 364/431.08 |
| 5,148,369 | 9/1992 | Uchinami et al. | 364/431.06 |
| 5,166,685 | 11/1992 | Campbell, Jr. et al. | 341/141 |
| 5,184,302 | 2/1993 | Ishida et al. | 364/413.11 |
| 5,212,483 | 5/1993 | Wakimoto | 341/141 |
| 5,291,197 | 3/1994 | Abe | 341/141 |

FOREIGN PATENT DOCUMENTS

| | | |
|---|---|---|
| 474025 | 3/1992 | European Pat. Off. . |
| 57-109002 | 7/1982 | Japan . |
| 2153248 | 6/1990 | Japan . |
| 2271719 | 11/1990 | Japan . |

Primary Examiner—Marc S. Hoff
Attorney, Agent, or Firm—Cushman, Darby & Cushman

[57] ABSTRACT

An A/D conversion control apparatus includes a control circuit for controlling various actuators and an A/D converter having a plurality of signal input channels. The control circuit and the A/D converter are packed in different IC packages and perform communication of a handshake system therebetween. Because the control of the A/D converter is performed based on channel start signals which are sequentially transmitted from a time synchronous register, complicated control such as schedule control in software is not required. A start signal stored in an asynchronous register is transmitted in response to a signal generated at an asynchronous timing and therefore can be processed at a different timing.

8 Claims, 9 Drawing Sheets

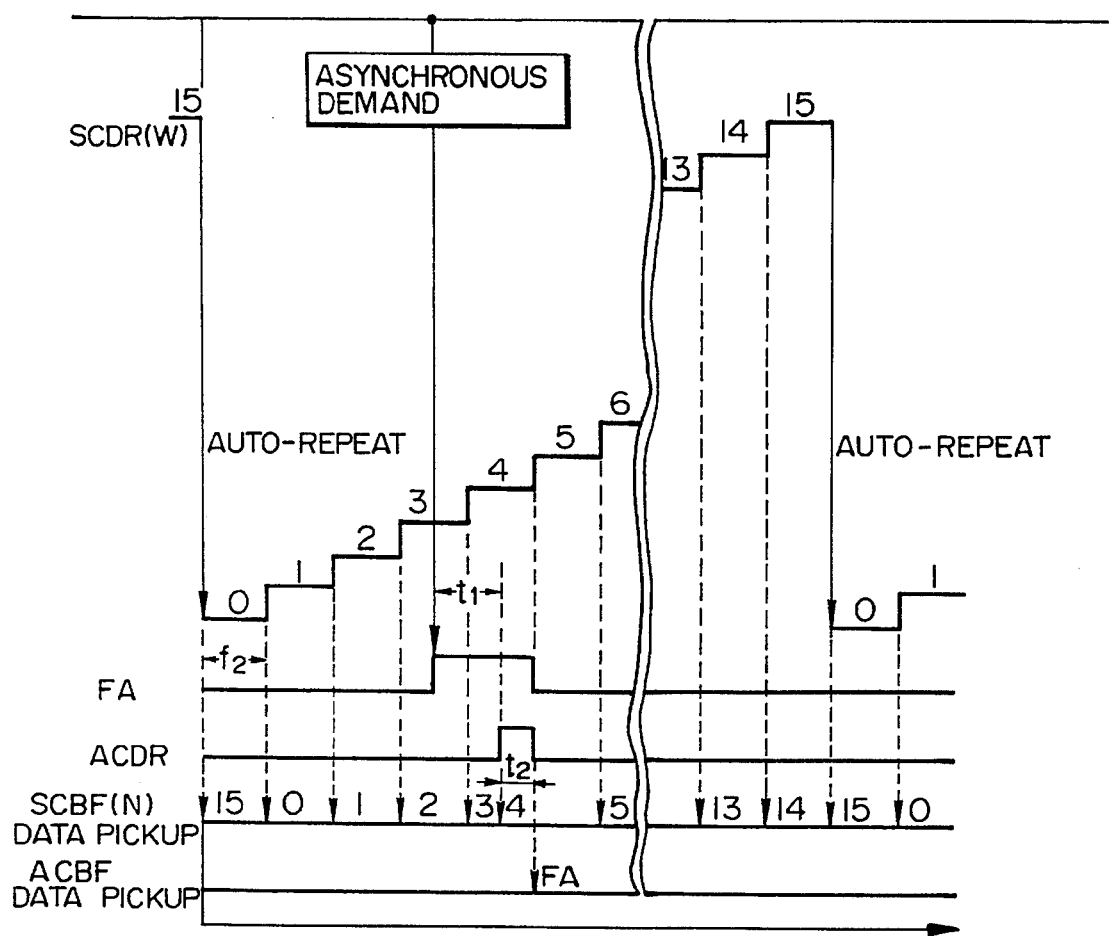

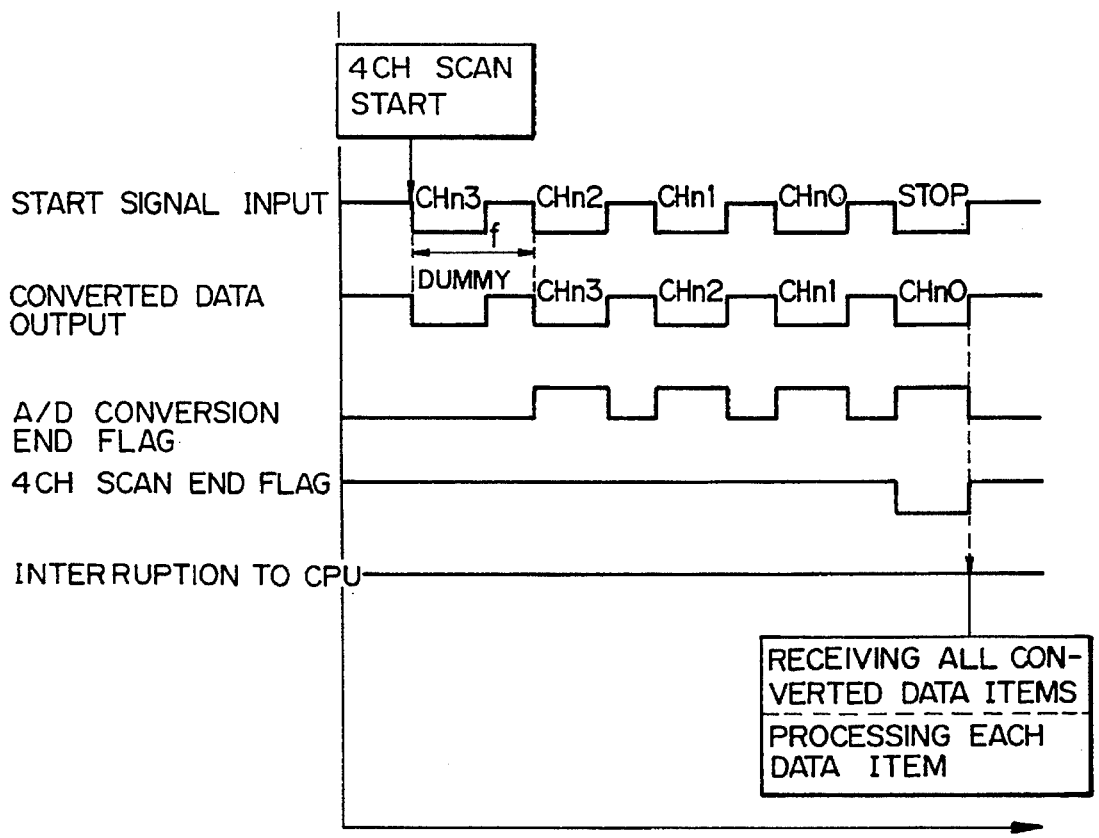

A/D CONVERSION CONTROL APPARATUS FOR AN INTERNAL COMBUSTION ENGINE

BACKGROUND OF THE INVENTION

Field of the Invention

The present invention relates to an A/D conversion control apparatus for an internal combustion engine, which apparatus has a plurality of signal input channels.

Description of Related Art

For control of an internal combustion engine for an automobile or the like, an analog/digital (A/D) converter is provided for converting analog signals inputted from various sensors for detecting states of an objective to be controlled, into digital signals. In JP-A-2-153248 an A/D conversion control apparatus is proposed in which a plurality of analog signals are sequentially A/D-converted at a predetermined period by hardware and stored in predetermined storage areas so that the load of software processing can be decreased. In the control of an internal combustion engine, however, the A/D conversion needs to be performed in synchronism with external signals such as a signal indicating engine rotation positions, as well as the A/D conversion at the predetermined period as in the above conventional apparatus. Thus, because the A/D conversion is performed only at the predetermined period in the conventional A/D conversion control apparatus, the internal combustion engine can not be controlled precisely.

SUMMARY OF THE INVENTION

The present invention has been made to solve the above problem and has, as an object, to provide an A/D conversion control apparatus in which not only the load of software processing can be decreased but also the A/D conversion can be performed both at a predetermined period and in synchronism with an external signal.

The first embodiment designed to achieve the above object, as shown in FIG. 1A, includes A/D converter means having a plurality of signal input channels, first storage means for storing a plurality of start signals for starting designated ones of the plurality of input channels of the A/D converter means and for sequentially transmitting the plurality of start signals, and second storage means for storing a start signal for starting a designated one of the plurality of input channels of the A/D converter means and for transmitting the start signal based on an external signal. The A/D converter means starts activating the input channels corresponding to the start signals from the first storage means or the start signal from the second storage means, respectively.

The second invention includes, as shown in a diagram of a basic structure of FIG. 1B, A/D converter means having a plurality of signal input channels, and control means for performing communication of a handshake system with the A/D converter means. The A/D converter means performs the reception of a start signal for each of the plurality of input channels of the A/D converter means and the transmission of after-conversion data obtained by the A/D converter means, with a timing signal from a unit other than the A/D Converter means.

According to the A/D conversion control apparatus of the first invention, the first storage means stores the plurality of start signals for starting the designated ones of the plurality of input channels of the A/D converter means and sequentially outputs the plurality of start signals. Similarly, the second storage means stores the start signal for starting the designated one of the plurality of input channels of the A/D converter means and outputs the start signal based on the external signal. The A/D converter means starts the input channels corresponding to the start signals from the first storage means or the start signal from the second storage means, respectively.

The control of the A/D converter means is performed based on the start signals sequentially transmitted from the first storage means and the start signal transmitted from the second storage means. Because the start signal is transmitted from the second storage means in response to the external signal, the control of the A/D converter means can be performed not only based on the start signal from the first storage means but also at the timing different from the timing of the start signals from the first storage means. For the internal combustion engine, the control of the A/D converter means needs to be performed at the different timings, e.g., at every predetermined period and in response to engine rotation. Even in such a case, the start signals stored in the first storage means can be outputted at the timing of the predetermined period or completion of the A/D conversion and the start signal stored in the second storage means can be output in synchronism with engine rotation.

According to the A/D conversion control apparatus for the internal combustion engine of the second invention, the A/D converter means having the plurality of input channels communicates with the control means in the handshake system. In this case, the A/D converter means performs the reception of the start signals for the plurality of input channels thereof and the transmission of the after-conversion data obtained by the A/D converter means, in response to the timing signal from the external unit.

The conversion time t required for A/D-converting the analog signal input to the A/D converter means is approximately constant (t=50 μs). That is, when the conversion time t has elapsed after each of the start signals for the input channels of the A/D converter means was input to the A/D converting means, the A/D conversion of the input signal can be considered to be completed even if the completion of the A/D conversion is not informed. Therefore, when the conversion time t has elapsed from the transmission of the start signal, the after-conversion data can be output with the timing signal supplied from the external unit outside of the A/D converter means.

The control means performs communication in the handshake system with the A/D converter means. As shown in FIG. 9B, the control means can perform the transmission of the start signal for each of the plurality of input channels and the reception of the after-conversion digital data in a period f (f>t) determined on the control means side. Therefore, the control means is not interrupted at each timing when the A/D conversion is completed.

BRIEF DESCRIPTION OF THE DRAWINGS

FIGS. 1A and 1B illustrate first and second embodiments, respectively;

FIGS. 3A-1, 3A-2, 3A-3 and 3B are diagrams for explaining a data communication system in a first embodiment, where FIG. 3A-1 shows a synchronous register, FIG. 3A-2 shows an asynchronous register FIG. 3A-3 shows a data pickup register and FIG. 3B shows the operation timing;

FIGS. 5A-1, 5A-2, 5A-3 and through 5B are diagrams for explaining a data communication system in a second embodiment, where FIG. 5A-1 shows a sequential register, FIG. 5A-2 shows an asynchronous register, FIG. 5A-3 shows a data pickup register and FIG. 5B shows the operation timing;

FIG. 6A shows the timing chart in the first embodiment, FIG. 6B shows the timing chart in the second embodiment, FIG. 6C shows the timing chart in a normal scan mode and FIG. 6D shows the timing chart in an external trigger mode;

FIGS. 9A and 9B are functional diagrams of the A/D converter, where FIG. 9A shows channel setting in a 4-channel scan mode and FIG. 9B shows timings in the 4-channel scan mode.

DETAILED DESCRIPTION OF THE PREFERRED EMBODIMENTS

The present invention will be described below with reference to the accompanying drawings.

Figure 1A:
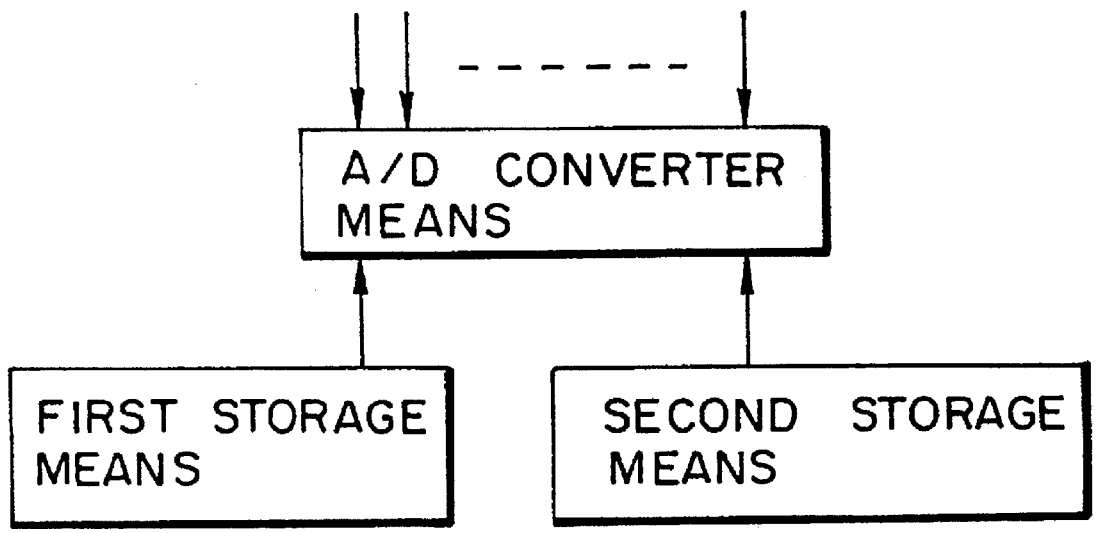
FIGS. 1A and 1B are schematic block diagrams, where
Figure 1B:
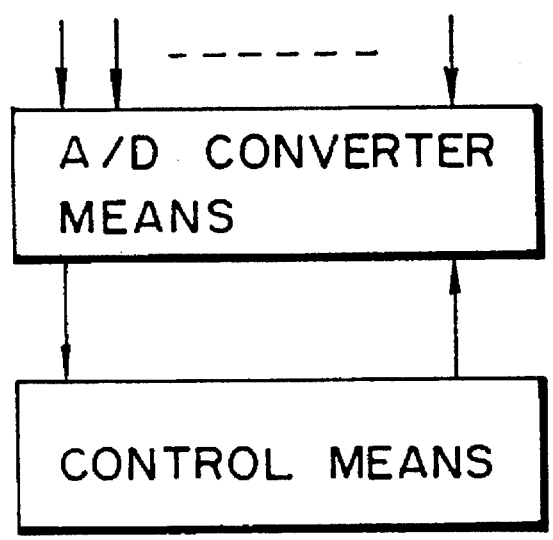
Figure 2:
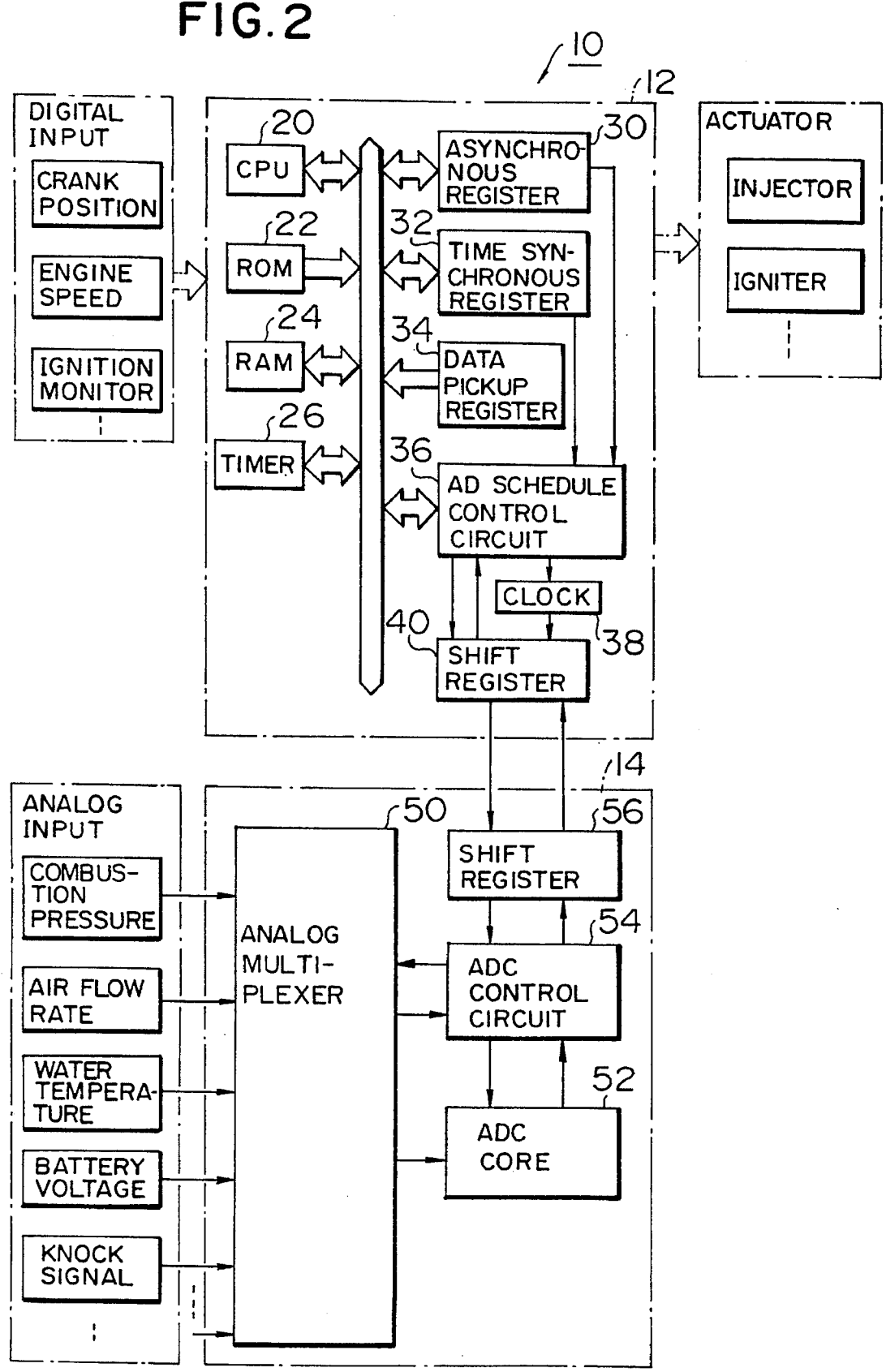
FIG. 2 is a block diagram showing the structure of an A/D conversion control apparatus for an internal combustion engine according to an embodiment of the present invention.

FIG. 2 is a block diagram showing an A/D conversion control apparatus 10 according to an embodiment of the present invention. The A/D conversion control apparatus 10 includes a control circuit 12 for controlling various actuators and an A/D converter 14 having a plurality of input channels. The control circuit 12 and the A/D converter 14 are constituted as separate or discrete IC packages and communication of a handshake system is performed therebetween.

The control circuit 12 is a microcomputer for performing various types of controls such as fuel injection control, ignition timing control, idle rotation speed control and transmission control. Also, the control circuit 12 executes predetermined operations based on digital data supplied from various sensors, digital data A/D-converted by the A/D converter 14, control signals supplied from an external unit. The digital data supplied to the control circuit 12 from the various sensors are such as a crank position, an engine speed, an ignition monitor value, an oxygen sensor value, an automobile speed, an idle signal value, air conditioner signal and a starter signal value.

The control circuit 12 includes a CPU 20, ROM (read only memory) 22, RAM (random access memory) 24, a timer 26, an asynchronous register 30, a time synchronous register 32, a data pickup register 34, an AD schedule control circuit 36, a shift clock 38 and a shift register 40 therein.

The CPU 20 is a central processing unit for, based on a control program stored in the ROM 22, executing various processes, and storing in the RAM 24 or transmitting to the external unit the operation result. The timer 26 supplies synchronous clock pulses to control the whole control circuit 12.

The asynchronous register 30 stores a start signal for starting or selecting a designated one of a plurality of signal input channels of the A/D converter 14 and is started or controlled by the CPU 20 based on an asynchronous timing signal which is synchronous with a crank position sensor input or the like so that the start signal for the A/D conversion is output.

The time synchronous register 32 stores a plurality of start signals for starting or selecting designated ones of the plurality of input channels of the A/D converter 14. The start signals stored therein are sequentially output in synchronism with a synchronous signal from the timer 26.

The data pickup register 34 stores after-conversion data obtained by the A/D conversion by the A/D converter 14. The data pickup register 34 has storage addresses in correspondence to the start signal stored in the asynchronous register 30 and the start signals stored in the time synchronous register 32.

The AD schedule control circuit 36 is a logic circuit for selecting one of the start signals supplied from the asynchronous register 30 or the time synchronous register 32 and supplying the selected start signal to the shift clock 38. Also, the AD schedule control circuit 36 receives the after-conversion data from the A/D converter 14 to write it in the data pickup register 34 at the same time.

The shift clock 38 generates pulses for the number of bits in the after-conversion data at the timing determined by the AD schedule control circuit 36. Based on the pulses generated by the shift clock 38, the timings for the supply of the start signal for each channel of the A/D converter 14 and the reception of the after-conversion data from the A/D converter 14 are determined. In the embodiment, because 16-bit data is transmitted or received, the shift clock 38 generates the pulses for 16 bits. The timing is synchronous and the timing determined by the synchronous signal which is generated based on the external input such as a crank position sensor input or the like could be considered as the timing determined by the AD schedule control circuit 36.

The shift register 40 transmits the start signal for each channel of the A/D converter 14 and receives the after-conversion data from the A/D converter 14. It transmits or receives 16-bit serial data in the embodiment.

The A/D converter 14 having a plurality of input channels converts each of the analog signals supplied from various sensors into digital data and transmits the digital data to the control circuit 12. The analog signals supplied to the A/D converter 14 are analog signals indicating a combustion pressure, a knock, an air flow rate, a battery voltage, a water temperature, an inlet air temperature, a throttle opening, and the like.

The A/D converter 14 includes an analog multiplexer 50, an ADC core 52, an ADC control circuit 54 and a shift register 56.

The analog multiplexer 50 switches twenty-four input channels of CH0 to CH23 to select the analog signal to be input to the A/D converter 14. The selection control of the input channel by the analog multiplexer 50 is controlled by the ADC control circuit 54. The analog signal input from the selected channel is supplied to the ADC core 52.

The ADC core 52 converts the analog signals into digital signals. The function of A/D conversion by the ADC core 52 is used commonly to the analog signals from the input channels. Thus, one analog signal is selected from among the plurality of analog signals input to the analog multiplexer 50 and is subjected to the A/D conversion.

The ADC control circuit 54 controls the analog multiplexer 50, the ADC core 52 and the shift register 56 to achieve the A/D conversion by the A/D converter 14. The ADC control circuit 54 transmits the channel start signal supplied from the shift register 56 to the analog multiplexer 50 to make the designated input channel selected and receives after-conversion data from the ADC core 52 to transmit the same to the shift register 56.

The shift register 56 receives a start signal for each input channel from the control circuit 12 and transmits the after-conversion data from the ADC core 52 to the control circuit 12. In the embodiment, 16-bit serial data is transmitted and received.

According to the above construction, the A/D converter 14 corresponds to A/D converter means and the CPU 20 corresponds to control means. Further, the time synchronous register 32 and the AD schedule control circuit 36 collectively correspond to first storage means and asynchronous register 30 and the AD schedule control circuit 36 collectively correspond to second storage means.

A data communication system achieved by the above construction will be described below in detail based on two embodiments.

Figures 1, 2, 3, 3A, 3B:
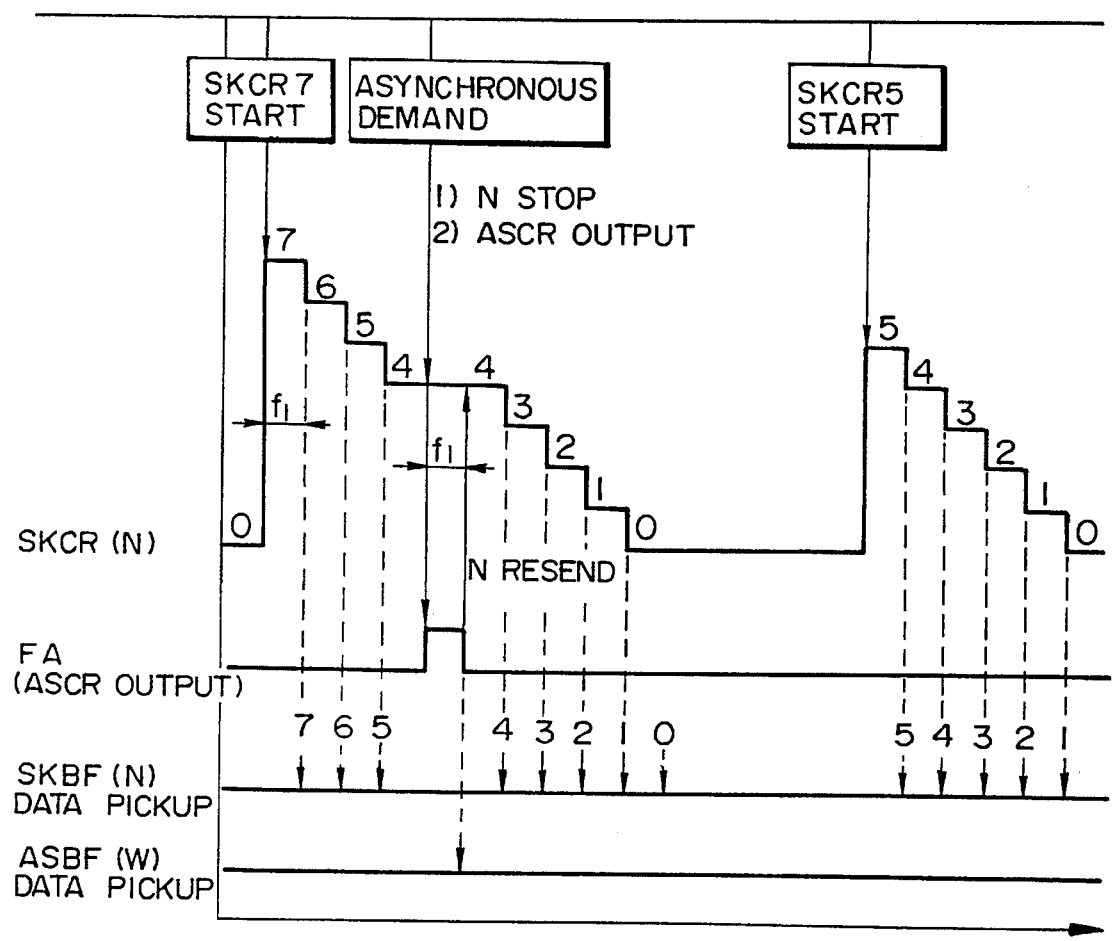

FIGS. 3A-1, 3A-2, 3A-3 and 3B show a data communication system executed by the control circuit 12 in a first embodiment. In this system channel start signals SKCR0 to SKCR7 for 8 bytes are stored in the time synchronous register 32 as shown in FIG. 3A-1. When the predetermined number of channels is given from the CPU 20, the channel start signals SKCR0 to SKCR are sequentially read out to be transmitted to the A/D converter 14. The channel start signals are sequentially read out one by one from the largest address number based on a given address of the time synchronous register 32 and then the transmission of the channel start signals SKCR is stopped when the channel start signal SKCR0 is transmitted last.

Also, as shown in FIG. 3A-2, a channel start signal ASCR for one byte is stored in the asynchronous register 30. When an interrupt is inputted from the external unit, the channel start signal ASCR is transmitted at a timing not synchronous with the reading out of the channel start signals SKCR.

As shown in FIG. 3A-3, the data pickup register 34 stores after-conversion data SKBF0 to SKBF7 and ASBF for mine 9 bytes. These data correspond to the channel start signals SKCR0 to SKCR7 and ASCR, respectively. For instance, data obtained by A/D-converting analog signal input to the channel which is started by the channel start signal SKCR4 corresponds to the after-conversion data SKBF4.

The timing when the registers 30 to 34 of the control circuit 12 perform a read operation or a write operation are shown in FIG. 3B. The control circuit 12 performs data communication of the handshake system with the A/D converter 14 and the transmission of the channel start signals SKCR0 to SKCR7 and ASCR and the reception of the after-conversion data SKBF0 to SKBF7 and ASBF from the A/D converter 14 are performed at the timing of pulses generated by the control circuit 12. Specifically, the transmission of the channel start signals SKCR0 to SKCR7 and the reception of the after-conversion data SKBF0 to SKBF7 are performed at a predetermined period f1 which satisfies f1>t, where t is a time required for each A/D conversion.

For instance, when an initiation signal is supplied such that the channel start signals are sequentially read out from the signal SKCR7, the channel start signals SKCR0 to SKCR7 stored in the time synchronous register 32 are sequentially transmitted to the A/D converter 14 at the period f1 from the channel start signal SKCR7. In synchronism with the transmission of the start signals, data obtained as the result of A/D-conversion by the A/D converter 14 are received as the after-conversion data SKBF7 to be stored in the data pickup register 34. That is, the after-conversion data SKBF7 is received in synchronism with the pulse of the same timing as that when the channel start signal SKCR6 is transmitted. When the after-conversion data SKBF0 for the channel start signal SKCR0 is received, the processing for the transmission and reception is completed. Then the CPU 20 is interrupted and these after-conversion data SKBF0 to SKBF7 are collectively subjected to code error detection and various operation processes.

In the system of the present embodiment, the A/D conversion by the A/D converter 14 is interrupted at the time when the asynchronous start signal is input and the A/D conversion for the analog signal input from the channel corresponding to the asynchronous start signal is executed. For instance, as shown in FIG. 3B, it is assumed that the asynchronous A/D conversion is requested after the channel start signal SKCR4 is transmitted and before the next channel start signal SKCR3 is transmitted. In this case, the A/D conversion for the channel start signal SKCR4 is interrupted temporarily and the channel start signal ASCR stored in the asynchronous register 30 is transmitted to the A/D converter 14 at the timing of the asynchronous request. The interrupted channel start signal SKCR3 is stored as N=4 in the other counter. After the period f1 has elapsed, the after-conversion data ASBF is received and stored in the data pickup register 34. At the same time, N =4 is read out from the counter and the channel start signal SKCR4 is transmitted to the A/D converter 14 again.

Figure 4:
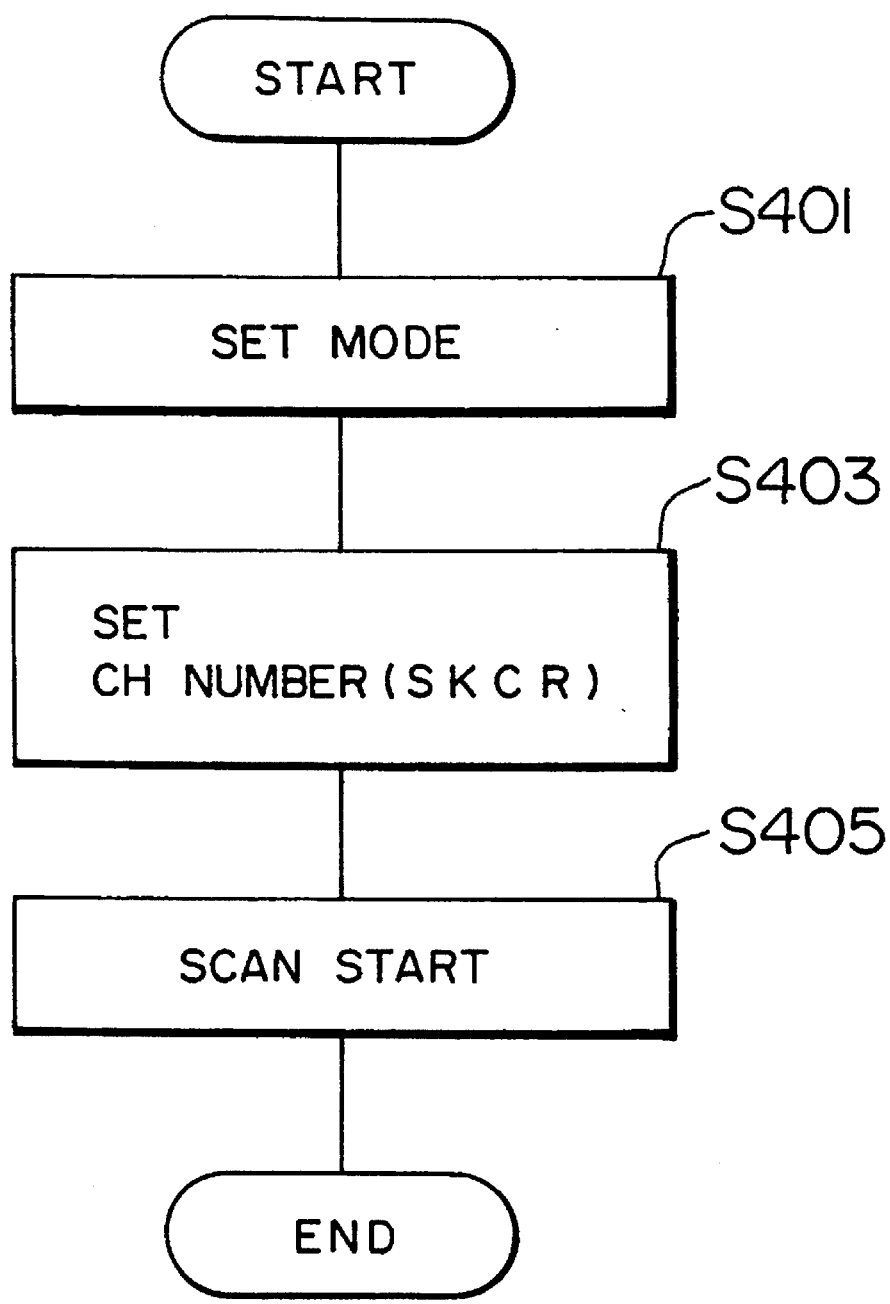
FIG. 4 is a flow chart for explaining the operation when a CPU starts the synchronous register.

FIG. 4 is a flow chart for explaining the transmission of the channel start signals SKCR0 to SKCR7 from the CPU 20 of the control circuit 12 in FIG. 3B. At first, a mode of the A/D converter 14 is determined (S401), and the number of channels (addresses where the channel start signals SKCRO through SKCR7 are stored) are set (S403). After this setting process is performed, scanning is started (S405) and the channel start signals SKCR0 to SLCR7 are transmitted to the A/D converter 14.

As described above, according to the A/D conversion control apparatus of the first embodiment, the control of the A/D converter 14 is performed based on the channel start signals SKCR0 to SKCR7 sequentially transmitted from the time synchronous register 32. Therefore, complicated control such as schedule control in software is not required. The channel start signal ASCR stored in the asynchronous register 30 is transmitted in response to the interrupt signal from the external unit. Therefore, the A/D converter 14 can be controlled for the signal ASCR at the different timing from the timings for the signals SKCR. For control of the internal combustion engine, the A/D converter 14 needs to be controlled at different timings, e.g., at the predetermined period and in synchronism with the engine rotation. For such a case, the present embodiment is so designed that the plurality of channel start signals SKCR0 to SKCR7 stored in the time synchronous register 32 are sequentially transmitted and the channel start signal ASCR stored in the asynchronous register 30 is additionally transmitted in synchronism with the crank position sensor input.

In this embodiment, without being notified of the completion of the A/D conversion, the A/D conversion of the corresponding analog signal is considered as completed and the after-conversion data SKBFO to SKBF7 and ASBF are transmitted at the timing from the control circuit 12. Since the control circuit 12 can execute processing of the after-conversion data SKBFO through SKBF7 altogether after receiving the predetermined number of data, interrupt requests to CPU20 may be reduced. Further, in the first embodiment, the A/D conversion of the corresponding channels is performed without any waiting time in response to the channel start signal ASCR, whose transmission is asynchronously requested, so that the control can be achieved with good response characteristics. Specifically, it is effective in the ignition timing control for knock control. The knock control is continuously performed such that the ignition timing does not coincide with the knocking of the engine The engine knocks are sensed between ignitions of cylinders of the engine. Thus, the engine efficiency can be increased so that it is made possible not only to increase the output performance and save fuel consumption but also to use mixed fuels of different octane values. In the knock control, the knock sensor mounted on the cylinder block senses knocks as vibration and the output from the knock sensor is calculated in the control circuit 12 to retard or advance the ignition timing. In this case, the analog signal from the knock sensor needs to be A/D-converted within the time interval between the ignitions so that the next ignition time can be calculated. Therefore, an extremely high response characteristic is required. For instance, when the engine speed is 5000 rpm, ignition is performed at a period of about 3 ms in the 8-cylinder engine, about 4 ms in the 6-cylinder engine and about 6 ms in the 4-cylinder engine. In addition, because asynchronous control having high response characteristics is required for sensor signals such as the combustion pressure signal for the ignition timing control, the first embodiment which performs the asynchronous control with high response characteristics is preferable.

Next, a second embodiment will be described below.

FIGS. 5A-1, 5A-2, 5A-3 and 5B show a data communication system of the second embodiment. As shown in FIG. 5A-1, in the second embodiment, a sequential register 32a is provided instead of the time synchronous register 32 in the first embodiment. The sequential register 32a stores channel start signals SCDR0 to SCDR15 for 16 bytes. FIG. 5A-2 shows an asynchronous register 30a similar to the asynchronous register 30 in the first embodiment and the register 30a stores the channel start signal ACDR as data. A data pickup register 34a is shown in FIG. 5A-3 and stores after-conversion data SCBF0 to SCBF15 and ACBF for seventeen bytes in correspondence to the channel start signals SCDR0 to SCDR15 and ACDR.

Although the channel start signals SKCR0 to SKCR7 are transmitted at the period f1 in the first embodiment, the channel start signals SCDR0 to SCDR15 in the second embodiment are transmitted at a period f2 (f2=256 μs) twice or more as long as the period f1. That is, while in the first embodiment the period f1 satisfying t<f1 is used where t is the A/D conversion time, in the second embodiment the period f2 satisfying f2>2×f1 is used. In this case, a half of the period f2 is longer than the A/D conversion time t.

In the second embodiment, the data communication system when an asynchronous request is received is different from that in the first embodiment. That is, the channel start signals SCDR0 to SCDR15 are sequentially read out from the sequential register 32a one by one from the smallest address, i.e. the channel start signal SCDR0. When the channel start signal SCDR15 of which address is largest is read out, the channel start signal SCDR0 is read out again. Thus, as long as a stop request is not input from the external unit, the channel start signals SCDR0 to SCDR15 are read out repeatedly and transmitted to the A/D converter 14.

It is shown in FIG. 5B how the registers 30a to 34a of the control circuit 12 perform read operations or write operations and the timing therefore. In the second embodiment, the control circuit 12 also performs handshake data communication with the A/D converter 14. The transmission of the channel start signals SCDR0 to SCDR15 and ACDR and the reception of after-conversion data SCBF0 to SCBF15 and ACBF are performed at the timings of pulses supplied from the control circuit 12.

As shown in FIG. 5B, the channel start signals SCDR0 to SCDR15 are sequentially and repeatedly read out one by one to be transmitted to the A/D converter 14. In synchronism with this, data A/D-converted by the A/D converter 14 are received from the A/D converter 14 as after-conversion data SCBF0 to SCBF15 to be stored in the data pickup register 34a.

It is assumed that asynchronous request for the A/D conversion is issued after the channel start signal SCDR3 is transmitted but before the next channel start signal SCDR4 is transmitted.

In the example shown in FIG. 5B, it is assumed that the asynchronous request is issued after a half of the period f2 from the time when the channel start signal SCDR3 is transmitted. In this case, the A/D conversion for the channel start signal SCDR3 is first performed and then the A/D conversion for the asynchronous request is performed after time t1. More particularly, the after-conversion data SCBF3 for the channel start signal SCDR3 is received after the period f2 to be stored in the data pickup register 34a. The next channel start signal SCDR4 is transmitted simultaneously with reception of the after-conversion data SCBF3. After the time f2/2 has elapsed, the after-conversion data SCBF4 for the channel start signal SCDR4 is received to be stored in the data pickup register 34a. Because the period f2 is set to be long, the A/D conversion can be regarded to be completed if a half of the period f2 has elapsed.

Further, at the same time when the after-conversion data SCBF4 is received, the channel start signal ACDR is read out from the asynchronous register 30a in response to the asynchronous request already input as an interrupt to be supplied to the A/D converter 14. At the time when a half of the period f2, i.e., a time t2 has elapsed, the after-conversion data ACBF for the channel start signal ACDR is received and the next channel start signal SCDR5 is transmitted.

If the asynchronous request is input before the time f2/2 elapses after the channel start signal SCDR3 has been transmitted, the after-conversion data SCBF3 can be received without waiting for the next channel start signal SCDR4 at the time when the time f2/2 elapses after the channel start signal SCDR3 has been transmitted and then the channel start signal ACDR can be transmitted. For this reason, the time t1 from when the asynchronous request is input to when the channel start signal ACDR is transmitted is shorter than the period f2.

Such an operation is repeated and, when the channel start signal SCDR15 is transmitted, the operation is automatically returned to the channel start signal SCDR0 and repeated until a signal instructing the process to stop is inputted. The CPU 20 is interrupted at the timing when the channel start signal SCDR0 is transmitted to the A/D converter 14 and the after-conversion data SCBF0 to SCBF15 are collectively subjected to the code error detection and various operation processes.

As described above, according to the A/D conversion control apparatus 10 of the second embodiment, substantially the same effect as in the first embodiment can be obtained.

In addition, in the second embodiment, there is provided the period f2 having a time margin such that the A/D conversion for an asynchronous request can be performed without distorting the synchronous process when the asynchronous request is issued. That is, the timings for the channel start signals SCDR0 to SCDR15 to be sequentially transmitted need not be deviated. For instance, if the deviation from the synchronous timing is for the throttle opening to be input synchronously, the difference of the actual operation amount from a desired operation amount is caused so that good operability cannot be sufficiently achieved. Thus, the second embodiment is effective when a sensor signal should be input without deviation from the synchronous timing.

Further, in the second embodiment, although the processing for the asynchronous request is possibly delayed for the time f2 at maximum, because the time f2 is sufficiently long, the response characteristic becomes only slightly low compared to that in the first embodiment, resulting in obtaining remarkable effects more advantageous than those achieved by the conventional apparatus.

Next, the process executed by the A/D converter 14 in the first and second embodiments will be described below. The first and second embodiments are designed to receive the after-conversion data from the A/D converter 14 at the timings of pulses from the control circuit 12 (the second invention). However, in order to obtain the effect according to the structure (the first invention) in which the channel start signals are transmitted at two different timings, there may be employed a structure in which an A/D conversion end flag from the A/D converter 14 may be detected and transmitted by the control circuit 12.

Figure 6A:
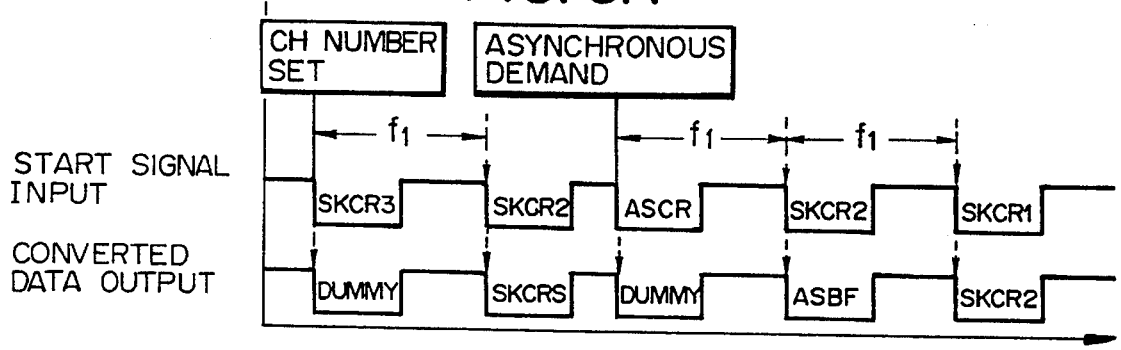
FIGS. 6A through 6D are timing charts of the operation of an A/D converter, where

FIGS. 6A to 6D show the timings of the transmission and reception of data at the A/D converter 14. FIG. 6A shows the timing of the data communication system according to the first embodiment. When the number of channels is set, the channel start signals SKCR are sequentially transmitted from the control circuit 12 at the period f1. At the same timing as this, the after-conversion data SCBF are transmitted. Because there is no after-conversion data for the first channel start signal SKCR3, dummy data is transmitted. At the timing when the asynchronous interrupt is inputted, the A/D conversion for the channel start signal SKCR3 is performed.

Figure 6B:
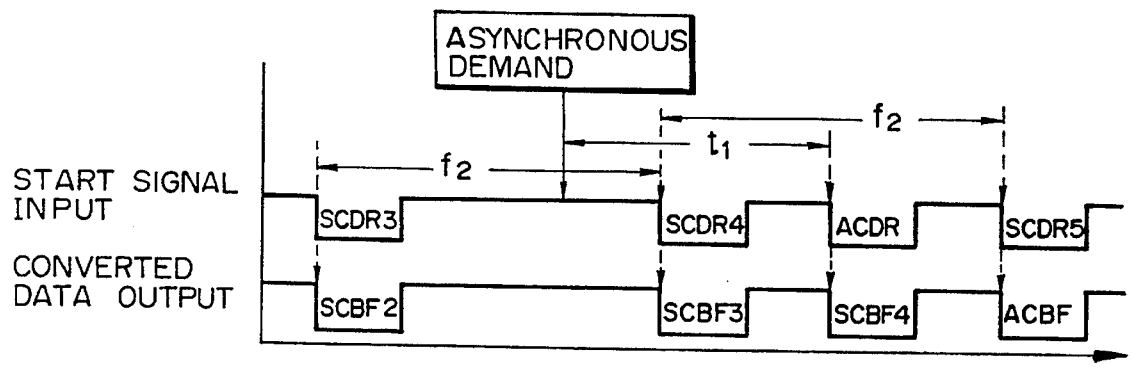

FIG. 6B shows the timing of the communication system according to the second embodiment. The channel start signals SCDR0 to SCDR15 are sequentially transmitted at the period f2 based on the signal transmitted from the control circuit 12. The process for the asynchronous request is performed after the time t1 shorter than the period f2. The detail of this has been already described.

Figure 6C:
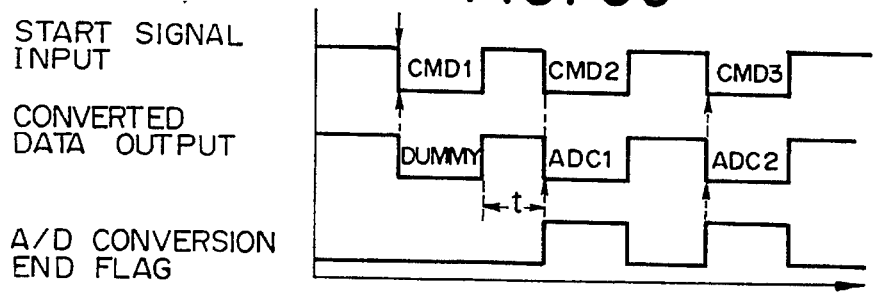

FIG. 6C shows the case where the A/D converter 14 is set in a normal mode. The after-conversion data is transmitted based on a flag set at the time t when the A/D conversion by the A/D converter 14 is completed. In this construction, data is transmitted at the timing on the A/D converter 14 side but the effect according to the first embodiment can be obtained.

Figure 6D:
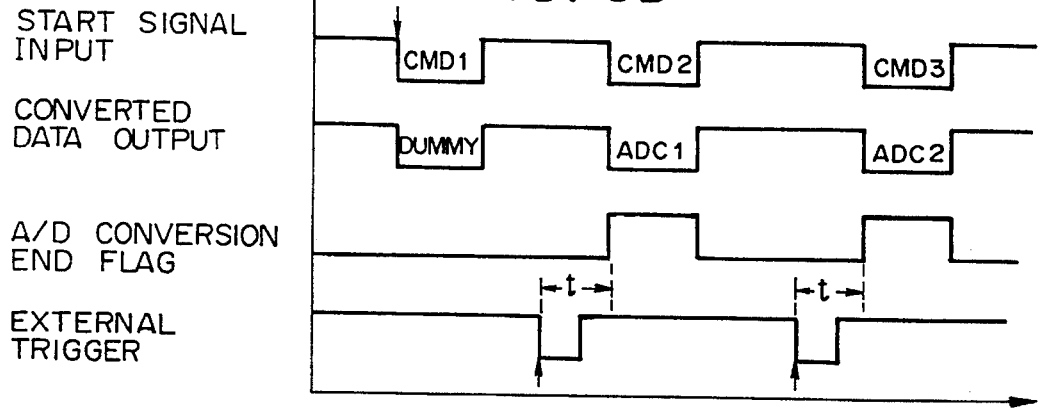

FIG. 6D shows a case where the A/D converter 14 is set in an external trigger mode. The A/D conversion is started in response to an external trigger. The after-conversion data is also transmitted to the control circuit 12 at the timing on the A/D converter 14 side in this construction.

The third embodiment will be described below.

Figure 7:
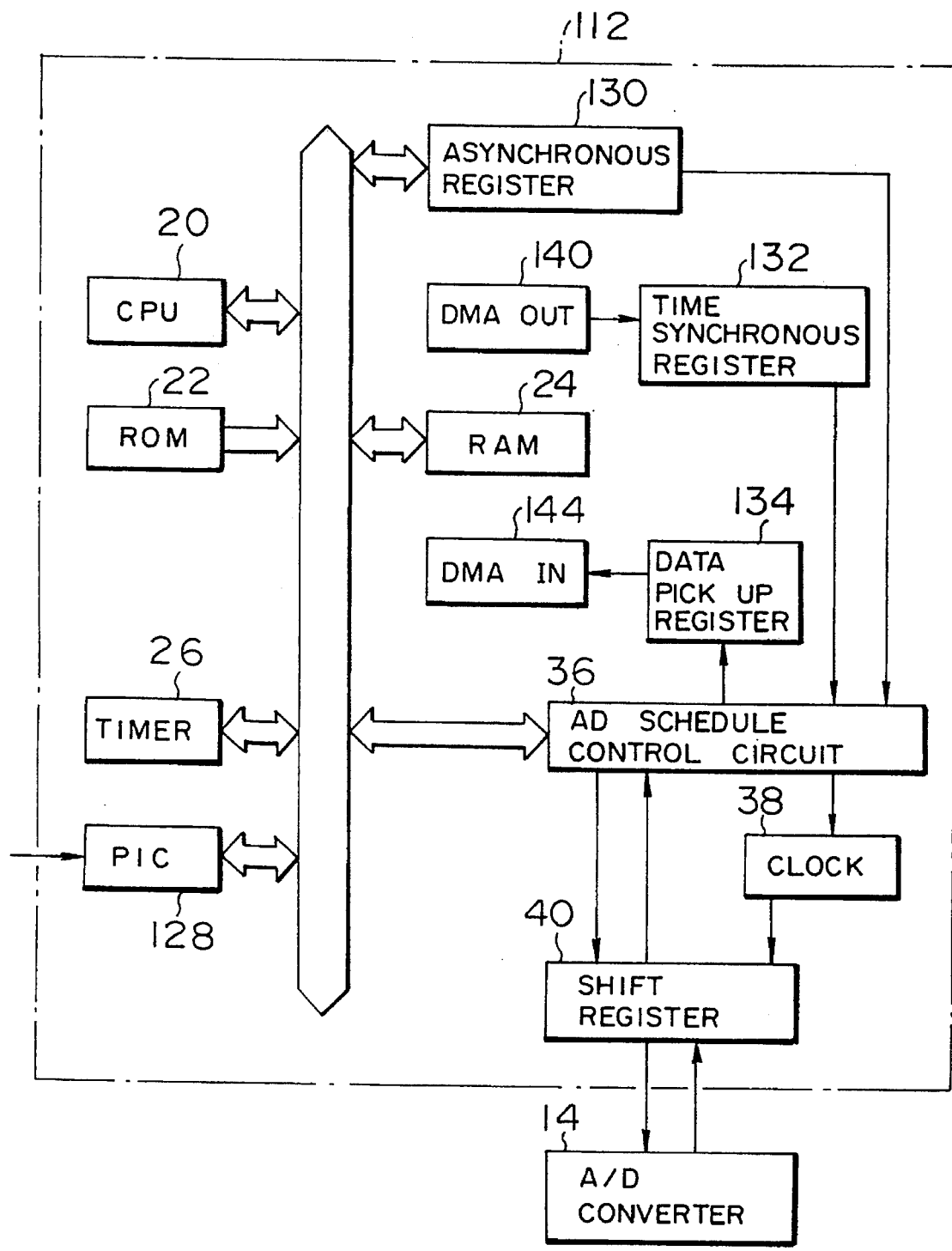
FIG. 7 is a block diagram showing a control circuit in a third embodiment.
Figure 8:
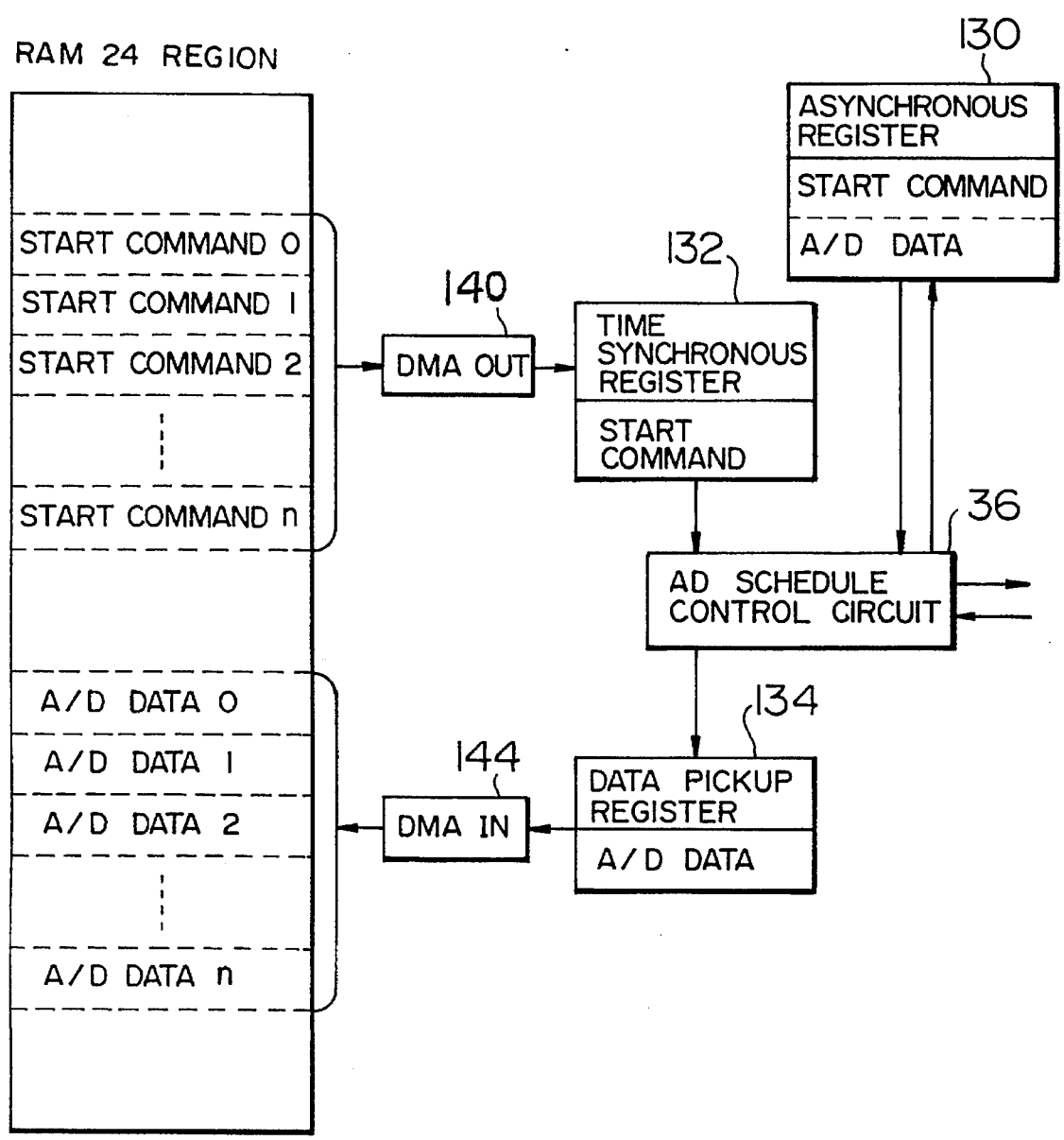
FIG. 8 is a block diagram in which only the characterized portion in the third embodiment is extracted.

FIG. 7 shows a block diagram of a control circuit 112 of the third embodiment, and FIG. 8 shows a block diagram of only a characterized portion extracted from the third embodiment. It should be noted that the same components as in the first and second embodiments are assigned with the same reference numerals, respectively, and the description of the same components is omitted.

The control circuit 112 of the third embodiment includes the CPU 20, the ROM 22, the RAM 24, the timer 26, the AD schedule control circuit 36, the shift clock 38, and the shift register 40 as in the first embodiment shown in FIG. 2, and further includes a programmable interaction controller (PIC) 128, an asynchronous register 130, a time synchronous register 132, a data pickup register 134, DMAout (a direct memory access) 140 and a DMAin 144.

The PIC 128 receives an external interrupt signal and is input with a signal at the timing asynchronous with the timing of the timer 26 when the engine speed is high, for example.

The asynchronous register 130 includes two registers, one for storing a start command to start one of the input channels to be A/D-converted in time synchronism, of a plurality of input channels of the A/D converter 14 (FIG. 2) and the other for storing the A/D data corresponding to the asynchronous start command.

The time synchronous register 132 stores the start command. The DMAout 140 sequentially reads out the start commands 0 to n stored in predetermined first storage areas of the RAM 24 to store them in the time synchronous register 132. On the contrary, the data pickup register 134 stores A/D data corresponding to the start command stored in the time synchronous register 132. The DMAin 144 stores A/D data stored in the data pickup register 134 in predetermined areas of RAM 24.

The AD schedule control circuit 136 selects the start command transmitted from either the asynchronous register 130 or the time synchronous register 132 to transmit the selected start command to the shift register 40. Also, it receives the A/D data A/D-converted by the A/D converter 14 from the shift register 40. Further, it determines whether the received data is associated with the start command from the asynchronous register 130 or the time synchronous register 132 to store the A/D data in the data pickup register 134 or the asynchronous register 130.

According to the control circuit 112 of the third embodiment having the construction as described above, the start commands 0 to n stored in the first predetermined storage areas of the RAM 24 are sequentially read out by the DMAout 140 at a predetermined period to be stored in the time synchronous register 132. The start command stored in the time synchronous register 132 is transmitted to the AD schedule control circuit 36, while another start command is transmitted from the asynchronous register 130 to the AD schedule control circuit 36 based on the asynchronous timing signal input to the PIC 128.

The AD schedule control circuit 136 selects the start command transmitted from the asynchronous register 130 or the time synchronous register 132 to transmit it to the shift register 40. The third embodiment is the same as in the first and second embodiments in the process from processing in which there is stored in the shift register 40 the A/D data after the A/D conversion by the A/D converter 14 in accordance with the start command to processing in which the A/D data is transmitted to the AD schedule control circuit 36.

The AD schedule control circuit 136 determines whether the received A/D data is for the start command transmitted from the asynchronous register 130 or for the start command transmitted from the time synchronous register 132. When the received A/D data is determined to be for the start command transmitted from the asynchronous register 130, the A/D data is stored in an A/D data register of the asynchronous register 130. On the other hand, when the received A/D data is for the start command transmitted from the time synchronous register 132, the A/D data is stored in the data pickup register 134. The A/D data stored in the data pickup register 134 is stored in a corresponding one of the second predetermined storage areas of the RAM 24 by the DMAin 144.

According to the third embodiment, the numbers of the time synchronous register 132 and the data pickup register 134 need not to be set based on the number of input channels of the A/D converter 14, resulting in increasing adaptability of the control circuit.

FIGS. 9A and 9B show a case where the A/D converter 14 is set in a 4-channel (4ch) scan mode. In this mode shown in FIG. 9A, when one channel is set, the A/D conversion for 4 channels is automatically performed. This construction can be applied to the first or second embodiment. The time synchronous register 32 or the sequential register 32a may be integrated into the same IC package on the A/D converter 14 side in achieving this mode. FIG. 9B shows that the after-conversion data is transmitted to the control circuit 12 at the timing determined by the A/D converter 14 side. In this case, a flag is necessary to indicate completion of the A/D conversion for 4 channels.

Not only the time synchronous register 32 and the sequential register 32a but also the asynchronous registers 0 and 30a may be disposed outside of the control circuit 12.

According to the present embodiment, the transmission of the start signal and the reception of the after-conversion data are performed at the same timing so that the control can be made easy and very desirable. In this case, however, if the time t elapses after the start signal is transmitted, the A/D conversion can be regarded to be completed. Therefore, the reception of the after-conversion data needs not take the same timing. The transmission of the start signal and the reception of the after-conversion data may be controlled by an external timing signal from any unit other than the control circuit 12 or the A/D converter 14.

As described above, in the control of A/D converter having a plurality of input channels it becomes possible to decrease the processing load of the control circuit, according to the A/D conversion control apparatus for the internal combustion engine of the present invention.

According to the A/D conversion control apparatus for the internal combustion engine of the first invention, the control of the A/D converter means is performed based on the start signals sequentially transmitted from the first storage means, and the start signals stored in the second storage means are transmitted based on the signal from the external unit. Therefore, the control of the second storage means can be performed at the different timing from that of the first storage means.

The A/D conversion control apparatus for the internal combustion engine of the second invention, the A/D converter means transmits the after-conversion data at the timing received from the external unit. Therefore, the control means is not interrupted frequently from the A/D converter means for the after-conversion data.

What is claimed is:

1. An A/D conversion control apparatus for an internal combustion engine, comprising:

A/D converter means having a plurality of analog input channels connected to sensors of said internal combustion engine, for performing an A/D conversion;

first storage means for storing time-synchronous start signals for starting designated ones of said plurality of analog input channels, and for sequentially transmitting said time-synchronous start signals, said first storage means sequentially outputting said time-synchronous start signals at a predetermined period of time longer than a time required for said A/D conversion by said A/D converter means; and second storage means for storing a time-asynchronous start signal required for starting a designated one of said plurality of analog input channels, and for transmitting said time-asynchronous start signal based on an external signal input to said second storage means, said external signal being indicative of a rotation position of said internal combustion engine;

said A/D converter means starting A/D conversion of said designated ones of said plurality of analog input channels in response to said time-synchronous start signals transmitted from said first storage means and in response to said time-asynchronous start signals transmitted from said second storage means, said A/D converter providing A/D converted data in response to each of said time-synchronous start signals transmitted from said first storage means.

2. An A/D conversion control apparatus for an internal combustion engine according to claim 1, wherein:

said A/D conversion of said designated one of said plurality of analog input channels corresponding to the time-asynchronous start signal transmitted from said second storage means is started with a first priority higher than a second priority corresponding to said time-synchronous start signal transmitted from said first storage means when said time-synchronous start signal is received by said A/D converter means from said second storage means while said time-synchronous start signals are sequentially being transmitted from said first storage means, and after an A/D conversion corresponding to said time-asynchronous start signal from said second storage means is completed, an interrupted A/D conversion of said plurality of analog input channels corresponding to said time-synchronous start signals transmitted from said first storage means are resumed.

3. An A/D conversion control apparatus for an internal combustion engine according to claim 1, wherein:

said predetermined period of time is at least twice as long as a required time for said conversion by said A/D converter means; and said A/D converter means starts said A/D conversion corresponding to said time-asynchronous start signal after said predetermined period of time elapses after transmission of said time-synchronous start signal by said first storage means.

4. An A/D conversion control apparatus for an internal combustion engine, comprising:

A/D converter means for converting an input analog signal into a digital signal;

an analog multiplexer having a plurality of input channels and an output channel, said analog multiplexer connecting, in response to start signals, one of a plurality of analog signals present on respective ones of said plurality of input channels to said output channel for input by said A/D converter means;

a CPU for designating ones of said plurality of input channels corresponding to designated ones of said respective plurality of analog signals to be A/D-converted;

a time synchronous register having a plurality of storage areas, said time synchronous register for storing synchronous start signals for said ones of said plurality of input channels designated by said CPU, and for sequentially outputting said synchronous start signals for starting A/D conversion of said designated ones of said plurality of analog signals, in synchronism with time;

an asynchronous register for outputting a prestored asynchronous start signal at a timing synchronous with a rotation of said internal combustion engine;

an AD schedule control circuit for receiving said synchronous start signals from said time synchronous register and said asynchronous start signal from said asynchronous register, and for selecting one of said synchronous start signals and said asynchronous start signal, for outputting said selected start signal to said A/D converter means, said AD schedule control circuit interrupting said output of said synchronous start signals from said time synchronous register to said A/D converter means and interjecting said asynchronous start signal from said asynchronous register to said A/D converter means, when said asynchronous start signal is received from said asynchronous register while said sequential synchronous start signals are being output by said time synchronous register, and then resumes output to said A/D converter means said synchronous start signals from said time synchronous register from a one of said synchronous start signals immediately before said interruption, said AD schedule control circuit sequentially outputting said synchronous start signals from said time synchronous register to said A/D converter means at every predetermined period of time longer than a time required for a single A/D conversion by said A/D converter means; and digital signal storage means for storing digital signals converted by said A/D converter means.

5. An A/D conversion control apparatus for an internal combustion engine according to claim 4, wherein:

said AD schedule control circuit outputs said asynchronous start signal immediately when said asynchronous start signal is received from said asynchronous register while said synchronous start signals are being sequentially output, and then sequentially outputs said synchronous start signals from said time synchronous register to said A/D converter means at every predetermined period of time from said synchronous start signal from said time synchronous register output immediately before said output of said asynchronous start signal from said asynchronous register, after said predetermined time has elapsed after said output of said asynchronous start signal from said asynchronous register to said A/D converter means, said A/D schedule control circuit transmitting A/D-converted data from said A/D converter means each time one of said synchronous start signals is output by said time synchronous register to said A/D converter means.

6. An A/D conversion control apparatus for an internal combustion engine, comprising:

A/D converter means for converting input analog signals into digital signals;

an analog multiplexer having a plurality of input channels and an output channel, said analog multiplexer connecting, in response to start signals, one of a plurality of analog signals present on respective ones of said plurality of input channels to said output channel for input by said A/D converter means;

a CPU for designating ones of said plurality of input channels corresponding to designated ones of said respective plurality of analog signals to be A/D-converted;

a time synchronous register having a plurality of storage areas, said time synchronous register for storing synchronous start signals for said ones of said plurality of input channels designated by said CPU, and for sequentially outputting said synchronous start signals for starting A/D conversion of said designated ones of said plurality of analog signals, in synchronism with time;

an asynchronous register for outputting a prestored asynchronous start signal at a timing synchronous with a rotation of said internal combustion engine;

an AD schedule control circuit for receiving said synchronous start signals from said time synchronous register and said asynchronous start signal from said asynchronous register, and for selecting one of said synchronous start signals and said asynchronous start signal, for outputting said selected start signal to said A/D converter means, said AD schedule control circuit interrupting said output of said synchronous start signals from said time synchronous register to said A/D converter means and interjecting said asynchronous start signal from said asynchronous register to said A/D converter means, when said asynchronous start signal is received from said asynchronous register while said sequential synchronous start signals are being output by said time synchronous register, and then resumes output to said A/D converter means said synchronous start signals from said time synchronous register from a one of said synchronous start signals immediately before said interruption, said AD schedule control circuit sequentially outputting said synchronous start signals from said time synchronous register to said A/D converter means at every predetermined period of time at least twice as long as a time required for a single A/D conversion by said A/D converter means; and digital signal storage means for storing digital signals converted by said A/D converter means.

7. An A/AD conversion control apparatus for an internal combustion engine according to claim 6, wherein:

said AD schedule control circuit outputs, when said asynchronous start signal is received from said asynchronous register during said sequential output of said synchronous start signals from said time synchronous register, said asynchronous start signal from said asynchronous register to said A/D converter means when one half of said predetermined period of time elapses, if a time elapsed from when said synchronous start signals from said time synchronous register immediately before said asynchronous start signal is output by said asynchronous register, is shorter than said half of said predetermined period of time, and said asynchronous start signal from said asynchronous register after said half of said predetermined period of time from when a next one of said synchronous start signals from said time synchronous register is output if said elapsed time is longer than said half of said predetermined period of time.

8. An A/D conversion control apparatus for an internal combustion engine, comprising:

A/D converter means for converting input analog signals into digital signals;

analog multiplexer means having a plurality of input channels and an output channel, said analog multiplexer connecting, in response to start signals, one of a plurality of analog signals present on respective ones of said plurality of input channels to said output channel for input by said A/D converter means;

random access memory means for storing in first storage areas thereof time-synchronous start commands for A/D conversion, and for storing in second storage areas thereof A/D conversion data from said A/D converter means;

asynchronous register means for outputting an asynchronous start command in response to an external signal applied thereto, said external signal corresponding to an engine rotation position, said asynchronous register means further for storing therein A/D conversion data from said A/D converter means;

AD schedule control means for sequentially transmitting said time-synchronous start commands at every predetermined time longer than an A/D conversion time, and said asynchronous start command, and for instructing said A/D converter means to convert said input analog signals into digital signals according to an order of selected commands at every predetermined time, and for transmitting said A/D conversion data obtained in response to said asynchronous start command to said asynchronous register means when said time-synchronous start command is received; an direct memory access means for transmitting said time-synchronous start commands from said random access memory means to said AD schedule means, and for transmitting said A/D conversion data obtained in response to said time-synchronous start command into said random access memory means.

* * * * *